(12) United States Patent
Goncalves et al.

(10) Patent No.: US 7,624,849 B2
(45) Date of Patent: Dec. 1, 2009

(54) BRAKE SYSTEM

(76) Inventors: Jorge M. Goncalves, R.R. #7, Simcoe, ON (CA) N3Y 4K6; Terry Faye, 176 Shaftsbury Avenue, Richmond Hill, ON (CA) L4C 0G2

( * ) Notice: Subject to any disclaimer, the term of this patent is extended or adjusted under 35 U.S.C. 154(b) by 423 days.

(21) Appl. No.: 10/210,100

(22) Filed: Aug. 2, 2002

(65) Prior Publication Data
US 2003/0024773 A1 Feb. 6, 2003

(51) Int. Cl.
*F16D 66/00* (2006.01)
*F16D 66/02* (2006.01)

(52) U.S. Cl. .......................... 188/1.11 R; 188/1.11 W; 188/72.9; 188/71.8

(58) Field of Classification Search ..... 188/1.11 L–1.11 W
See application file for complete search history.

(56) References Cited
U.S. PATENT DOCUMENTS

| | | | | |
|---|---|---|---|---|
| 4,583,071 A | * | 4/1986 | Sebalos et al. | 188/1.11 L |
| 4,757,300 A | * | 7/1988 | Sebalos | 188/1.11 L |
| 5,044,302 A | * | 9/1991 | Goldfein et al. | 116/208 |
| 5,226,509 A | * | 7/1993 | Smith | 188/1.11 W |
| 5,266,917 A | * | 11/1993 | Bleeke et al. | 338/32 H |
| 5,358,075 A | * | 10/1994 | Jarzombeck | 188/1.11 L |
| 5,967,266 A | * | 10/1999 | Carnegie | 188/1.11 L |
| 6,135,242 A | * | 10/2000 | Hockley | 188/1.11 R |
| 6,352,137 B1 | * | 3/2002 | Stegall et al. | 188/1.11 L |
| 6,411,206 B1 | * | 6/2002 | Weant et al. | 340/479 |
| 6,501,375 B1 | * | 12/2002 | Weant et al. | 340/479 |

FOREIGN PATENT DOCUMENTS

WO    WO 9816407 A1 *  4/1998

\* cited by examiner

*Primary Examiner*—Robert A Siconolfi
*Assistant Examiner*—Mahbubur Rashid

(57) ABSTRACT

Structure disposed within a brake housing for measuring the displacement of a reference within said brake housing so as to indicate the brake stroke condition on a vehicle braking system.

14 Claims, 16 Drawing Sheets

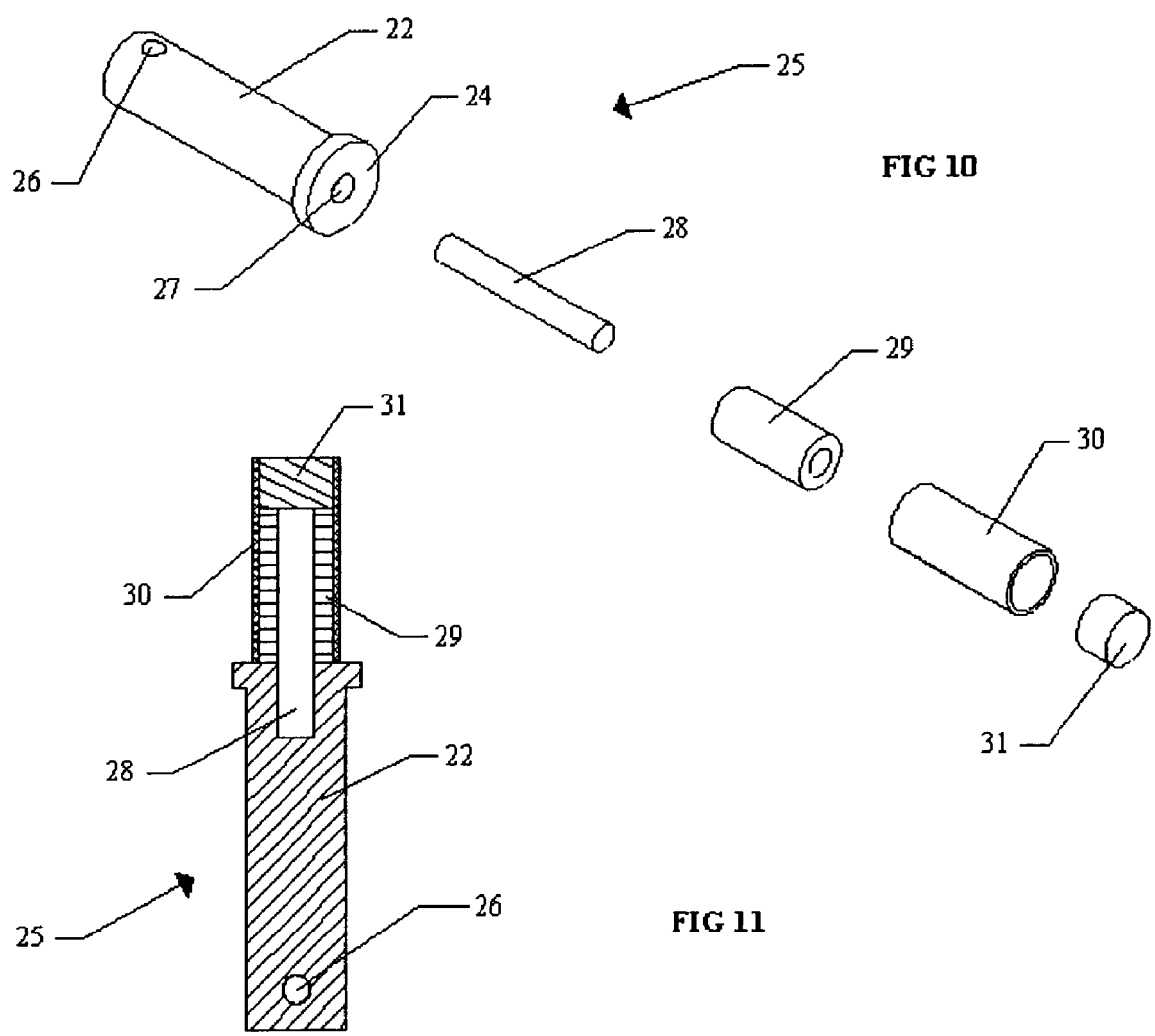

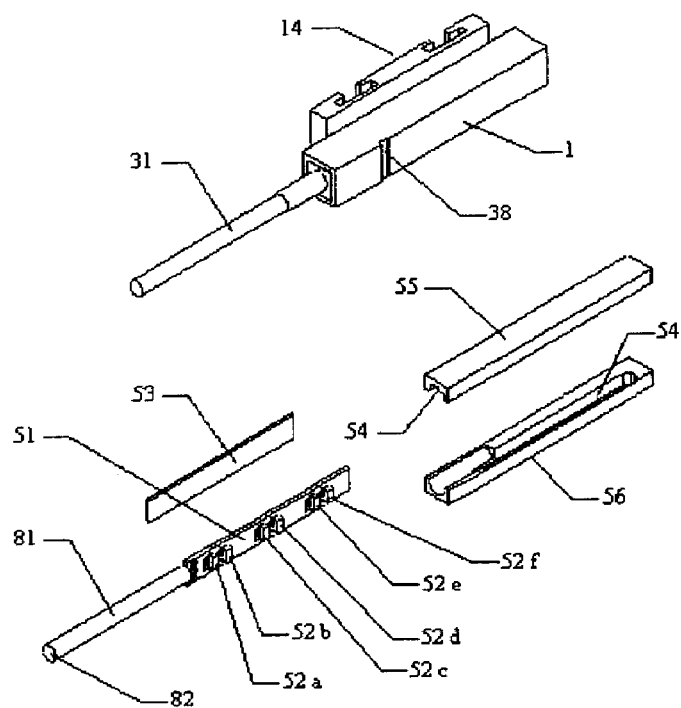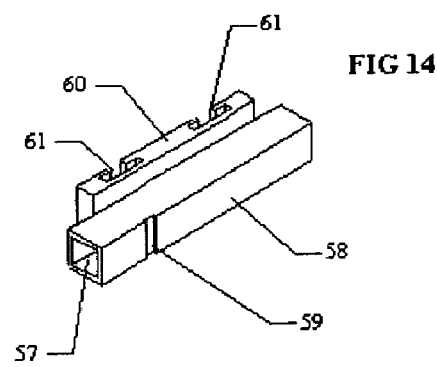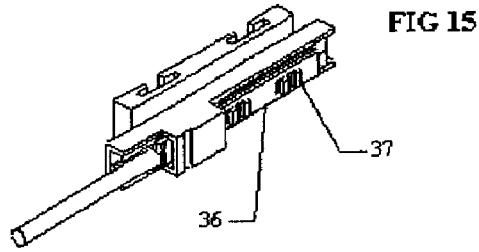

| HALL TRIGGER SEQUENCE | REFERENCE VOLTAGE | ASSOCIATED DISPLAY COLOR |
| --- | --- | --- |
| 52a,52b | 0.6 | START |
| 52a,52b,52c | 0.5 | |
| 52b,52c | 1.25 | FIRST GREEN |
| 52b,52c,52d | 1.1 | |
| 52c,52d | 1.9 | SECOND GREEN |
| 52c,52d,52e | 1.78 | |
| 52d,52e | 2.8 | THIRD GREEN |
| 52d,52e,52f | 2.63 | |
| 52e,52f | 3.71 | YELLOW |
| 52f | 4.55 | RED |
| | 5.0 | |

Fig 26

BRAKE SYSTEM

FIELD OF INVENTION

This invention relates generally to a braking system and in particular to means for indicating brake stroke condition on an air braking system.

BACKGROUND ART

It is generally recognized that there is a need to be able to accurately determine the brake stroke condition on a vehicle's brakes so as to ensure the timely maintenance of the vehicle's braking system. As most braking systems are difficult to inspect many vehicle operators let the maintenance of the brakes lapse which can result in the loss of brake effectiveness. There have been many prior art devices to address the aforementioned problem such as for example U.S. Pat. Nos. 4,279,214, 4,776,438 and 4,879,964.

Many of such prior art devices include gauges and reference indicators that are located on the brake rods or clevis pins such as for example disclosed by U.S. Pat. Nos. 5,320,198 and 5,441,128. Canadian Patent No. 2,186,271 which shows the use of a brake adjustment indicator including a mounting bracket having an elongated body with a slot and a spacer for receiving two bolts for indicating limit positions.

It is an object of this invention to provide an alternate means of measuring brake stroke conditions by disposing said means within a brake housing.

It is a further object of this invention to provide a simplified structure which is easy to install and maintain.

DISCLOSURE OF INVENTION

It is an aspect of this invention to provide a structure disposed within a brake housing for measuring the displacement of a reference within said brake housing so as to indicate the brake stroke condition on a vehicle braking system.

BRIEF DESCRIPTION OF DRAWINGS

FIG. 10 shows an exploded view of a magnetic clevis pin.

FIG. 11 is a side sectional view of the magnetic clevis pin.

FIG. 13 illustrates one embodiment of the assembled sensor.

FIG. 14 is an exploded view of the sensor.

FIG. 15 is a partial cut out view of the sensor.

FIG. 17a is a representative drawing of a hardwired single vehicle display.

FIG. 26 is a table illustrating all trigger sequence, reference voltage and associated display colour.

BEST MODE FOR CARRYING OUT THE INVENTION

Figure 1:
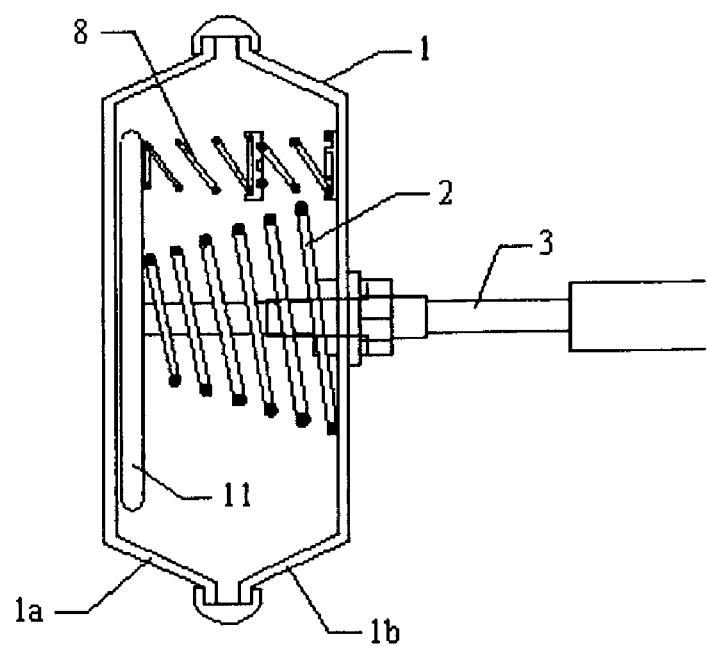
FIG. 1 is a representative drawing of a section through a brake housing, and shows the strong spring in a free state.

In the description which follows, like parts are marked throughout the specification and the drawings with the same respective reference numerals. The drawings are not necessarily to scale and in some instances proportions may have been exaggerated in order to more clearly depict certain features of the invention.

Generally speaking Hall-effect switches provide a convenient way of sensing linear or angular position. Hall-effect linear systems from Honeywell Micro Switch™, Allegro Microsystems™, Siemens and other manufacturers provide sensing function. "Ratiometric" means that the output voltage is proportional to the magnetic field strength. Hall-effect sensors, coupled with current excitation and signal conditioning means provide a voltage output in the presence of a magnetic field. The Hall-effect shown in FIG. 1 illustrates a contact less sensing (i.e. minimal mechanical wear), system. Hall-effect linear systems from Honeywell Micro Switch™ and Allegro Microsystems™ provide a ratiometric sensing function. "Ratiometric" means that the output voltage is proportional to the magnetic field strength.

FIG. 1 illustrates one means or structure that is disposed within a brake housing 1 for measuring the displacement of a reference within the brake housing 1 so as to indicate the brake stroke condition on a vehicle braking system. The reference chosen in FIG. 1 comprises a push rod back plate 11 which is connected to the push rod 3 that extends within the confines of the brake housing 1 and extends upwardly and connected to the clevis generally illustrated by the "U-shaped" structure. The clevis is connected to the remainder of the braking system in a manner well known to those persons skilled in the art.

Upon activation of the braking system as shown in FIG. 1 the back plate 11 moves linearly from the position shown in FIG. 1 towards the right so as to compress the return spring 2. In this fashion the push rod back plate 11 is displaceable or travels in a linear manner between the two spaced walls of the brake housing 1. In other words during brake activation the push rod back plate 11 travels towards the right hand sidewall of the brake housing. Upon deactivation of the braking system the push rod back plate 11 is returned to its original position shown in FIG. 1 by means of the return spring 2. The brake housing 1 shown in FIG. 1 consists of two brake housings 1a, 1b connected together by means of a connector as shown in FIG. 1.

Figure 3:
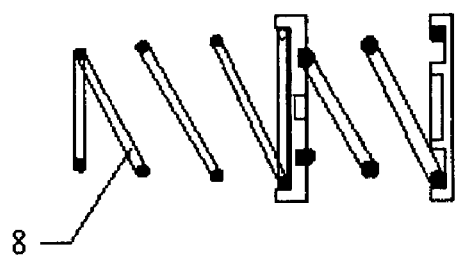
FIG. 3 is a representative drawing of a Hall-effect ratiometric sensor with both the strong spring and weak spring in a free state.
Figure 2:
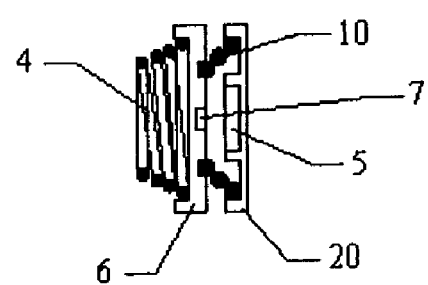
FIG. 2 is a schematic drawing of the Hall-effect ratiometric sensor in a compressed state.

Accordingly one may insert means disposed within the brake housing 1 for measuring the displacement of the push rod back plate 11. The means shown in FIG. 1 consists of a Hall-effect ratiometric sensor generally shown in FIGS. 2 and 3. In particular the Hall-effect ratiometric sensor comprises a strong spring 4, a ratiometric sensor 5 and a magnet housing 6 which includes the magnet 7. More particularly the Hall-effect sensor includes a first housing 20 which is secured to one of said spaced walls 1b and the first housing 20 includes the ratiometric sensor 5 as best illustrated in FIG. 3. The Hall sensor 5 also includes a second moveable housing 6 which includes the magnet 7. The first and second housing 20 and 6 is connected together by a weak spring 10. FIG. 3 illustrates the weak spring 10 in a free state. A strong spring 4 is also utilized which is connected to the second moveable housing 6 and the push rod back plate 11. Although strong and weak springs are illustrated in FIGS. 1, 2 and 3 any other biasing means such as leaf springs or other biasing means such as cylinders or the like may be utilized so long as the following operation is realized.

The Hall-effect ratiometric sensor is one that reduces or increases the voltage output according to a magnetic flux strength. The principle of the Hall-effect sensor is to measure linear travel inside the air brake chamber. The sensor is fastened on the inside of the brake housing. The strong spring 4 is connected to the magnetic housing 6 while the weak spring 10 extends outwardly from the magnetic housing 6 to the sensor housing 20. When the back plate 11 travels towards the sensor 5 the total difference in travel from the initial position of the back plate 11 to its final position during braking is determine by the difference in the spring forces between the strong and weak springs.

Moreover as the magnet 7 approaches closer to the ratiometric sensor 5 a voltage signal is generated according to the proximity of the magnet towards the face of the sensor. Such signal may then be utilized to indicate or measure the brake stroke condition on a vehicle braking system in a manner to be more fully described herein. More specifically a strong spring 4 and a weak spring 10 have been utilized in accordance with the ratiometric sensor 5 since the magnet 7 will have a predictable and effective impact on the sensor 5 over a defined path of travel toward and away from the sensor 5. In other words, if the magnet was located on the back plate and the Hall sensor 1b, the magnet 7 would generally be too far away from the sensor 5 to produce a meaningful accurate reading. However, by the arrangement shown in FIG. 1, the strong spring presents the magnet 7 in the vicinity of the Hall sensor 5 where relatively accurate readings can be made, and as the back plate 11 moves toward the sensor housing 20 the distance of travel of the magnetic housing 6 and the magnet 7 relative from the sensor housing will be a function of the difference in the spring forces of the strong spring 4 and weak spring 10. In other words, the distance of travel of back plate 11 relative the sensor housing 20 will be greater than the distance travel of the magnetic housing 6 relative the sensor housing 20. Accordingly accurate and meaningful readings can be obtained.

Figure 4:
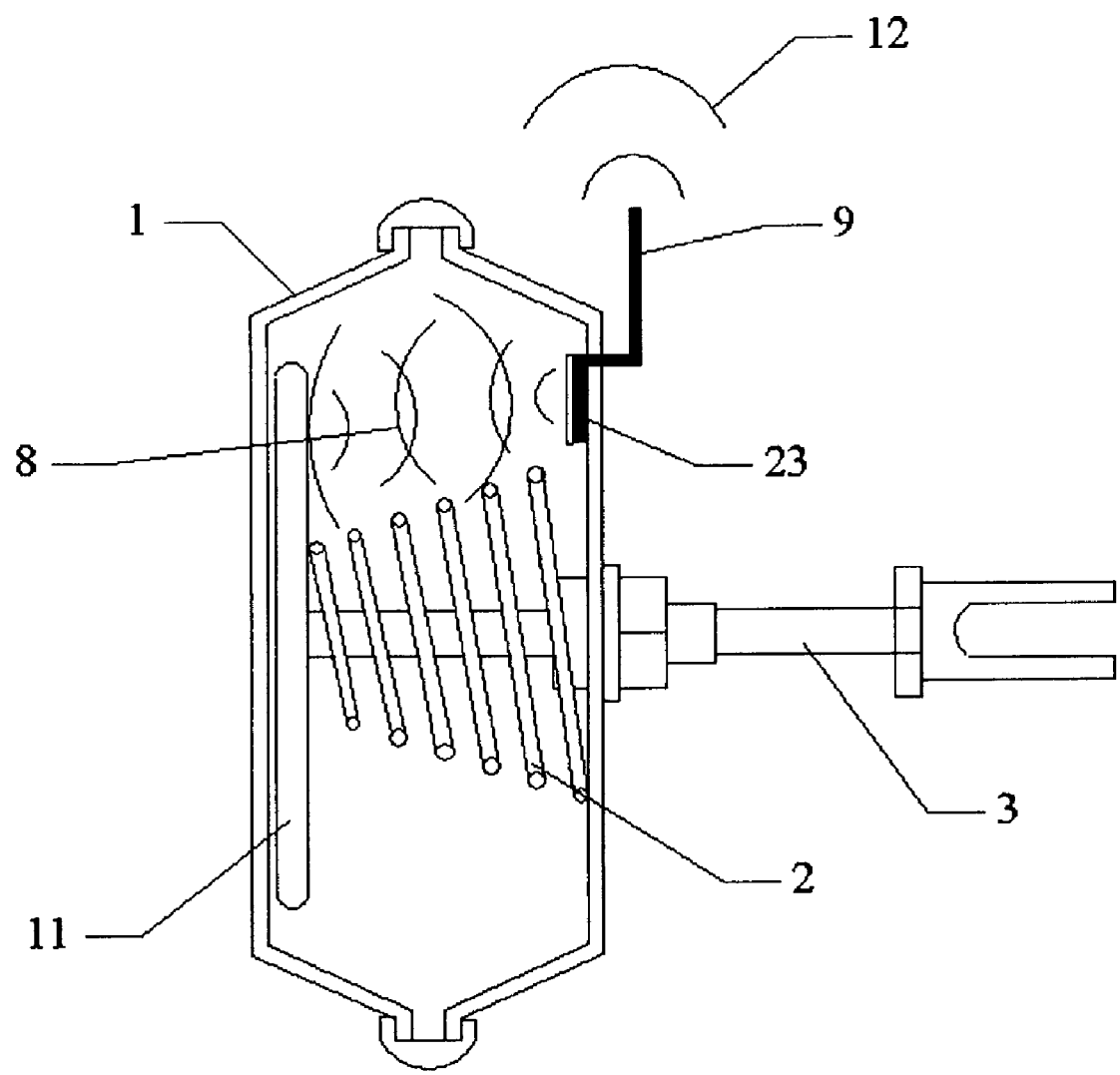
FIG. 4 is a representative drawing of a section through a second embodiment of the invention illustrating radar structure for receiving reflected radar waves measuring linear motion.

FIG. 4 illustrates an alternate embodiment of the invention which utilizes electromagnetic radiation generating means to generate an electromagnetic radiation wave towards the displaceable push rod back plate 6 as shown in FIG. 4 so as to measure the brake stroke condition.

In particular the electromagnetic radiation generating means shown in FIG. 4 may in one embodiment comprise a radar generating and receiving means 23 which generate radar waves towards the surface of the push rod back plate 11. The radar waves bounce off the surface of the push rod back plate 11 back towards the radar transceiver 23. The reflected radar waves 8 may be used to measure the linear motion of first the push rod back plate 11 and thus the brake travel of the push rod 3 and clevis and other braking surfaces. An antenna 9 may be utilized to generate transmitting waves 12 which may be picked up by display means so as to display the condition of the brake stroke in a manner to be more fully described herein. The brake housing 1 also includes the brake return spring 2.

Figure 5:
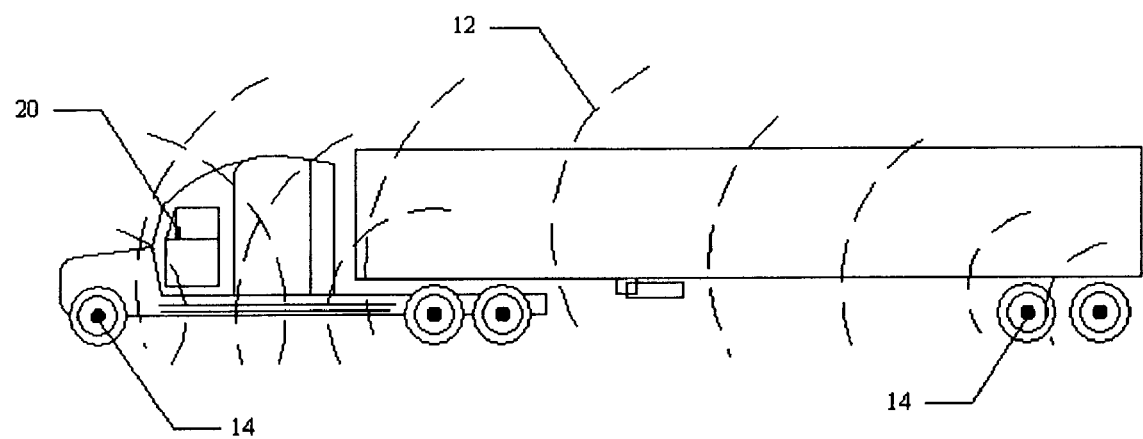
FIG. 5 is a representative drawing of a transport utilizing a wireless system.

Accordingly the sensor shown in FIG. 4 utilizes radar waves which bounce off the push rod back plate 11 in a manner to measure linear motion. The sensor shown in FIG. 4 is capable of transmitting signals to a wireless receiver. One example of a wireless receiver is shown in FIG. 5, which consists of a truck transport, having battery operated sensors 14. Such battery operated sensors 14 may consist of the sensor shown in FIG. 4 as well as the sensor shown in FIGS. 1, 2 and 3. The batteries provide the power for the signals to be generated by the sensor shown in FIGS. 1, 2, 3 and 4. The wireless system shown in FIG. 5 is well suited for the generation of the radar waves shown in FIG. 4 while the signals generated by the Hall-effect ratiometric sensor shown in FIGS. 1, 2 and 3 need to be transduced into a radar or other signal such as radio frequency or the like. The signal could also be transduced into a radar or other signal such as radio frequency or the like and encoded\decoded by the module 80 and multiplexed to display 20 via wiring harness 50.

The wireless system shown in FIG. 5 consists of the display module 20 and sensors that have self-contained battery power. Other power systems can be used. The sensors use transmitting technology and receive radar signals to measure the linear motion and also to transmit the sensor signals into the display module.

Figure 6:
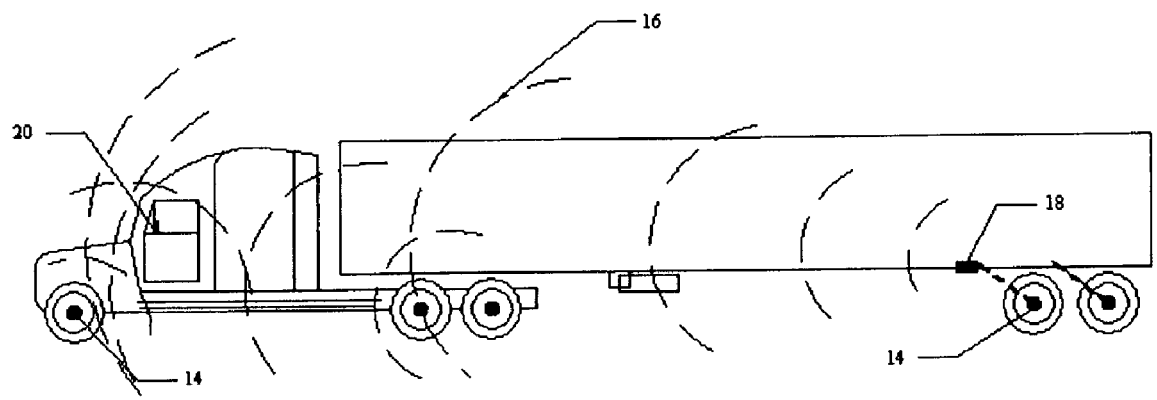
FIG. 6 is a representative drawing of a transport utilizing a multiplex wireless system.

FIG. 6 is a variation of the structure shown in FIG. 5 and particularly relates to a multiplex wireless system. FIG. 6 illustrates the display module 20 and sensors 14 as well as, a wireless transmission signal 16. FIG. 6 also shows the transmitter modules 18.

In particular FIG. 6 illustrates that the system consists of a display module 20, sensors 14, and transmitter mode module 18 through wireless transmission 16.

Figure 7:
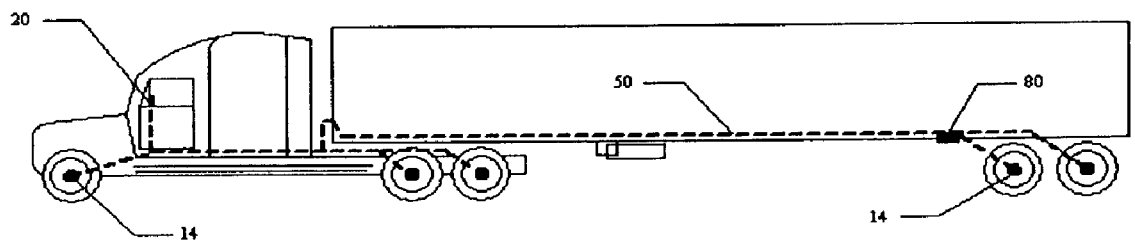
FIG. 7 is a representative drawing of a transport utilizing a multiplex unit and hard wires.

Finally FIG. 7 illustrates a multiplex unit which is hard wired. In particular the transport shown in FIG. 7 illustrates the wiring harness 50, which is generally added to the transport.

The system shown in FIG. 7 is well suited for the sensors shown in FIGS. 1, 2 and 3 which generate a voltage in response to the Hall-effect described above. FIG. 7 also illustrates the display module 20, sensors 14 which measure the brake stroke travel. Numeral 80 illustrates the multiplex transmitter module.

The multiplex system consists of a display module 20 and using the truck and trailer harness 80 or an add on stand alone truck and trailer harness. A sensor 14 as illustrated may be utilized with a multiplexing transmitter module 80 to transmit multiple signals from multiple axles. When the multiplex transmitter module 80 receives the signals from the sensors 14 the multiplex transmitter module encodes the multiple signals through one of the existing wiring harness conductors unto the display module 1. The availability of spare conductors eliminates running extra wiring through tractor and trailer units. A stand alone wiring harness may be added to the tractor and trailer to connect module 80 to display module 20.

Figure 8:
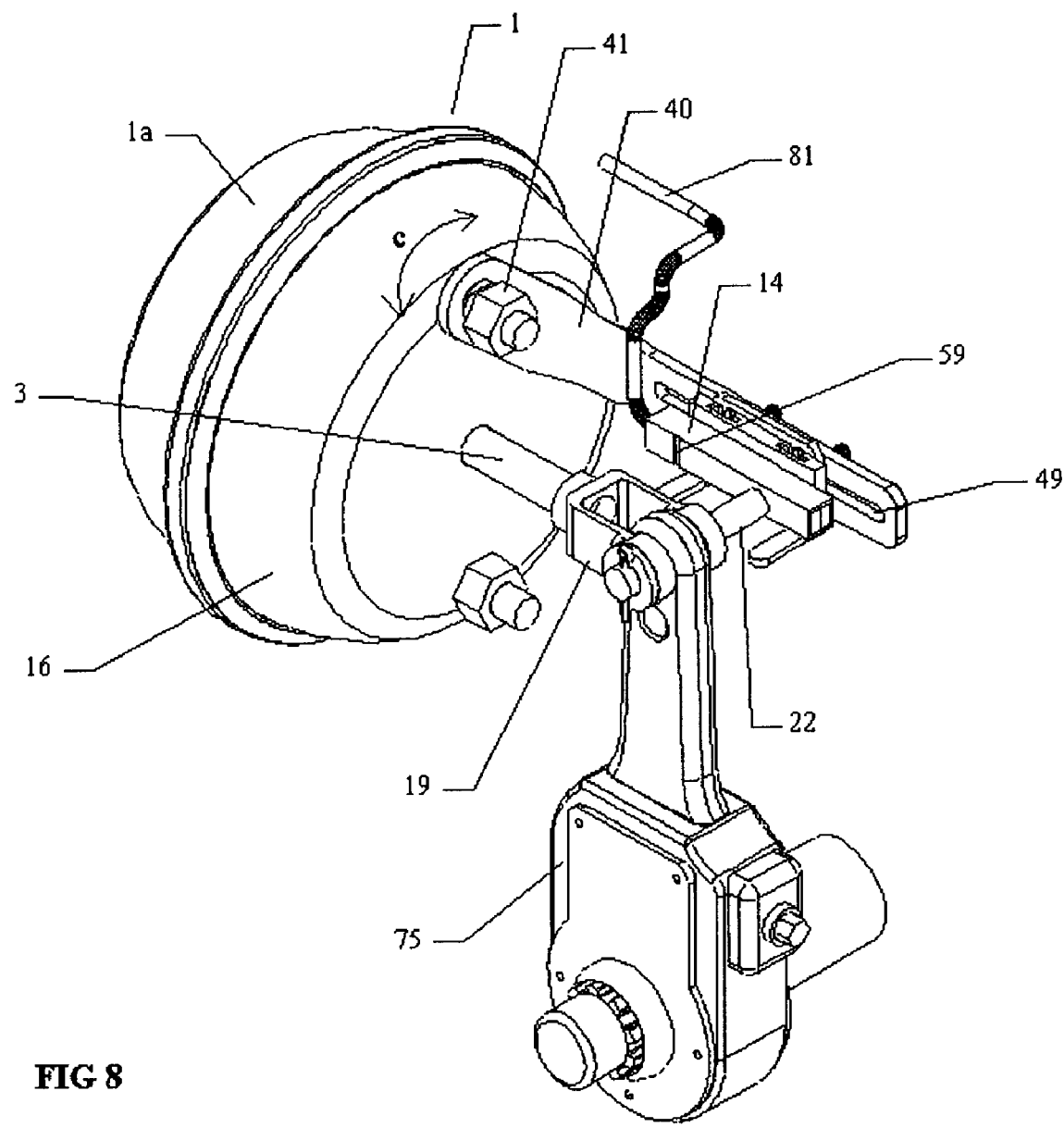
FIG. 8 illustrates one embodiment of the invention illustrating a Hall-effect sensor.

FIG. 8 illustrates another embodiment of the invention illustrating the Hall-effect sensor 14 attached to a bracket 40 which in turn is attached to the brake housing 1. More specifically the brake housing 1 defines the air application cylinder having the back plate 11 as shown in FIG. 1 which in turn is connected to the push rod 3. One end of the push rod 3 presents a Y-bolt or clevis 19.

Figure 9:
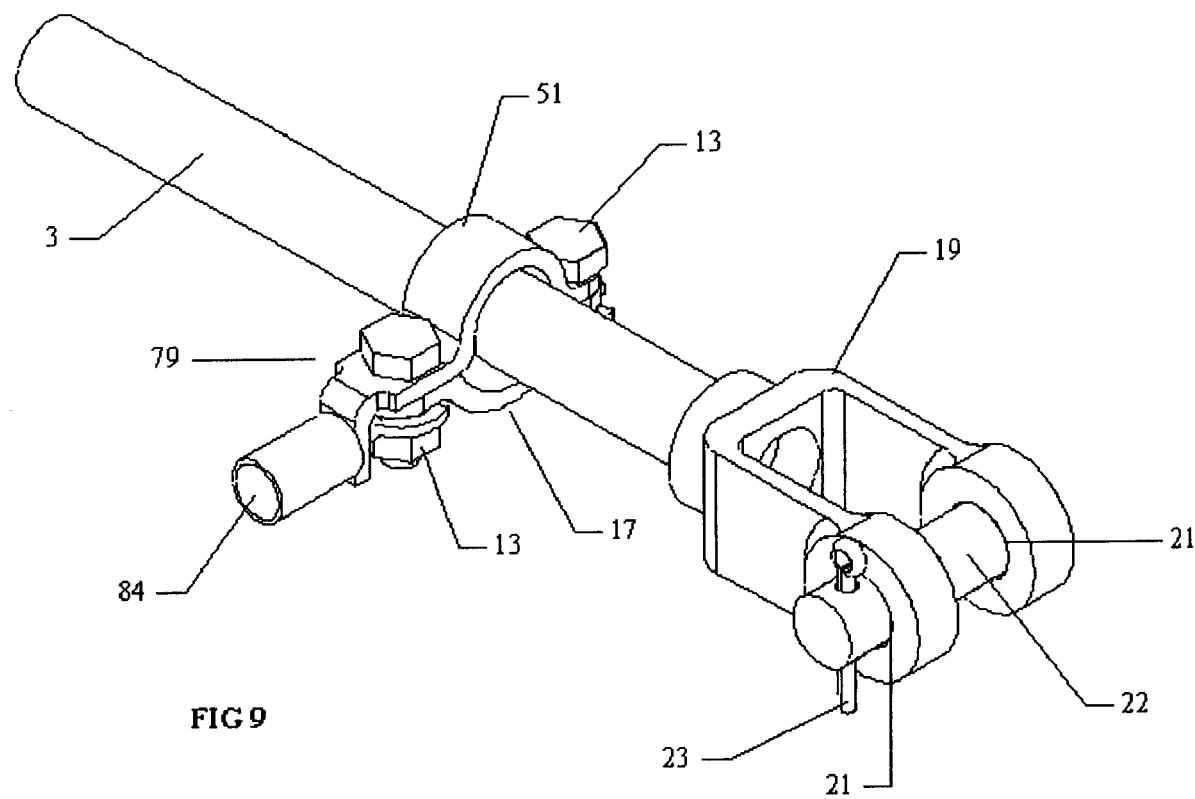
FIG. 9 illustrates the push rod and clevis pin.

The bifurcated ends of the clevis 19 include aligned holes 21 as best seen in FIG. 9. The clevis pin holes 21 are adapted to receive the clevis pin 22. The clevis pin 22 as shown in FIG.

9 illustrates the standard clevis pin 22 which is locked in place by means of a cotter pin 23. The end of the standard clevis pin 22 opposite the cotter pin 23 has been modified and includes a magnetic clevis pin head 24 such as the one shown in FIG. 10. A cotter pin 23 is used as a retaining device to prevent the clevis pin 22 from becoming dislodged from the Y-bolt or clevis 19.

More particularly in one embodiment described herein the standard clevis pin 22 is removed and substituted by the magnetic clevis pin 25 as shown in FIGS. 10 and 11. The modified clevis pin 22 with clevis pin hole 26 includes a bore 27 which is drilled into the body of the clevis pin 22 as shown in FIG. 11. The bore 27 is adapted to receive a rod 28 which can be comprised of a variety of materials including mild steel. In one embodiment the rod 28 is press fit into bore 27. An insert 29 can be placed over the rod 28 as shown in FIG. 11 as well as an outer sleeve 30 which can comprise of a variety of materials including aluminium. A clevis pin magnet 31 is received within the outer sleeve 30 as shown in FIG. 1.

Generally speaking FIG. 11. illustrates a clevis pin 25 having one end thereof magnetized. The magnetized end 32 is opposite the clevis pin hole 26.

Accordingly a magnetized clevis pin 25 is assembled within the clevis pin holes 21 as shown in FIGS. 8 and 9 and retained in place by means of the cotter pin 23. The magnetized end 31 of the clevis pin 25 is disposed adjacent the sensor 14 in a manner to be more fully described herein.

Figure 12:
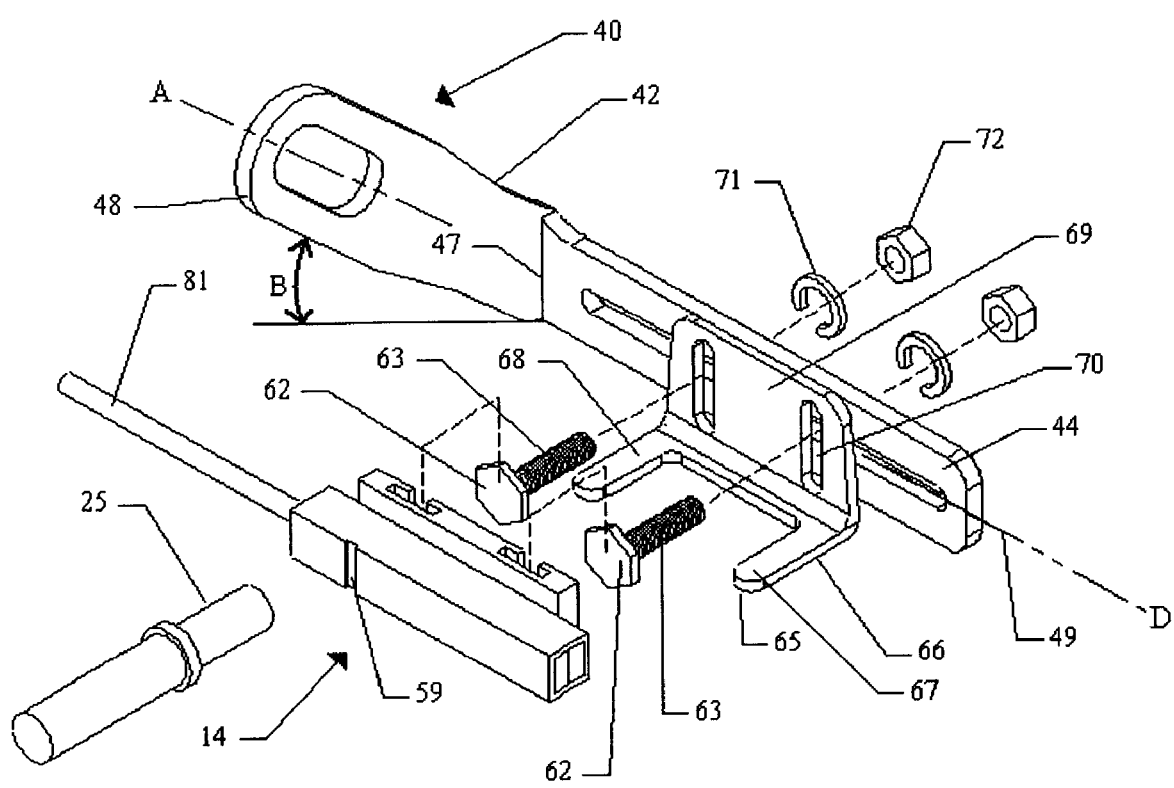
FIG. 12 illustrates the mounting bracket.

Furthermore FIG. 8 also illustrates the use of a bracket 40 which is attached to the brake housing 1 by fastening means 41 which consists of a nut and bolt. FIG. 12 shows the mounting bracket 40 which can be used to mount the sensor 14 to a truck or trailer or the like. In particular the mounting bracket 40 comprises a first attachment portion 42 and a second sensor attachment arm 44. The bracket 40 can comprise a one piece metal whereby the attachment 42 is disposed generally perpendicularly or at 90° to the attachment arm 44. Moreover the attachment portion 42 includes an attachment slot 45 adapted to receive the fastening means 41 as shown in FIG. 8. Furthermore the attachment slot 45 is generally elongated in the direction of the axis A as shown in FIG. 12 so as to permit the bracket 40 to be adjusted along the slot in the direction A with respect to the fastening means 41 which defines a first degree of movement within the slot 45 along the direction of the axis A. More specifically the first attachment portion 42 is adapted to contact the cylinder end surface 46 as shown in FIG. 8.

As mentioned above, the sensor attachment arm extends generally perpendicularly outwardly from the attachment portion 42. In other words, the bracket 40 can be stamped from a single piece of mild steel and then bent along fold line 47 so that the first attachment portion 42 is at a generally perpendicular angle to the sensor attachment arm 44. Furthermore the axis A of the first attachment portion 42 is disposed at an angle B from an horizontal plane as best seen in FIG. 12. In other words, when the sensor arm 44 is disposed 90° to a flat surface (not shown) the edge 48 of the attachment portion 42 is at an angle B to the horizontal plane. Accordingly the bracket 40 may be rotated about the axis of the fastening means 41 in an arc represented by C as shown in FIG. 8. This represents a second degree of movement of the bracket relative the clevis pin 22.

Moreover the sensor attachment arm 44 also includes an attachment arm slot 49 as best shown in FIG. 12. The slot 49 is disposed along an axis D as best shown in FIG. 12 and represents a third degree of movement of the sensor 14 in a manner to be described herein.

Accordingly the bracket 40 provides an easy and efficient way of mounting the sensor 14 adjacent the magnetic clevis pin 25 by manipulating the bracket and sensor 14 relative the clevis pin along the four degrees of movement, namely, A, C, D and E.

One embodiment of the sensor is shown in FIGS. 12-15.

Specifically FIGS. 13-15 illustrate a Hall sensor although any variety of sensors can be utilized within the spirit of the invention and FIGS. 13-15 are for illustrative purposes only and should not limit the scope of the invention.

More specifically FIG. 14 illustrates a PCB board 51 having a plurality of Hall switches 52. In particular there are six Hall switches 52 shown in FIG. 14 which are spaced apart as illustrated on the PCB board 51. Furthermore a magnetic flux plate 53 is also shown whereby the magnetic flux plate 53 is brought together with the PCB board 51 so as to fit within the interior chamber 54 defined by the mating of the upper sensor board plastic insert 55 with the lower sensor board plastic insert 56 as best seen in FIG. 14. Once the inserts 55 and 56 are mated, they are adapted to fit within the interior confines 57 of the sensor housing 58. The sensor housing 58 includes a sensor starting point mark 59.

The sensor housing 58 also includes a fastening plate 60 to attach the sensor 14 to the bracket 40 as best illustrated in FIG. 12.

The fastening plate 60 includes hex-head slots 61 adapted to receive the heads 62 of hex-bolt 63. Hex-head slots 61 provide a fourth axis of movement to pitch the sensor at an angle to maximize the magnetic field strength in relationship to E.

FIG. 12 also illustrates the use of visual brake stroke indicating means which consists of visual indicating bracket 66 having two spaced indicating fingers 67 and 68. The visual indicating bracket 66 also includes a mounting bracket 69 having two spaced slots 70 adapted to receive the ends of the bolts 63. More specifically the bolts 63 are adapted to be received by the slots 70, and attachment arm slot 49 and are fastened thereto by means of washers 71 and nuts 72. Accordingly the sensor 14 may be moved relative the sensor arm 44 by loosening the nuts 72 and moving the assembly along the arm 44 along the direction D until the magnetic clevis 25 lines up with sensor starting mark 59.

Figure 16:
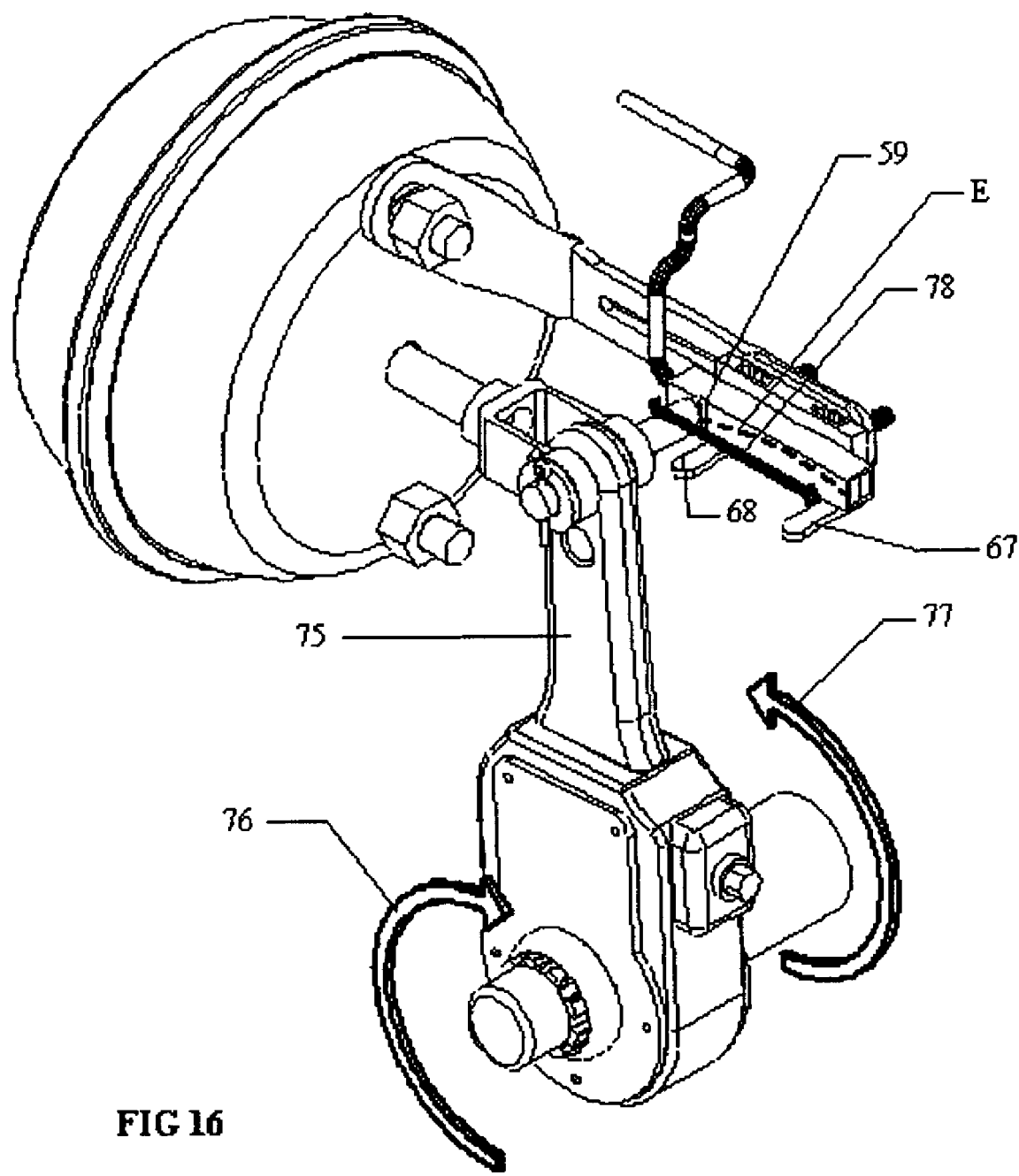
FIG. 16 illustrates the slack travel time rotation and path.

FIG. 16 illustrates generally the slack adjuster 75 which automatically adjusts for brake wear in a manner well known to those persons skilled in the art. Generally speaking FIG. 16 shows the slack adjuster 75 moving in the forward rotation 76 and reverse rotation 77.

The sensor 14 is assembled close to the magnetic clevis pin 25 by adjusting the bracket 40 with the four axis of movement, namely, A, C, D and E so that the magnetic tip of the clevis 31 is adjacent the sensor starting point mark 59. As the brake is activated the back plate 11 moves as described causing the clevis pin 3 to move outwardly so as to move the magnetic tip of the clevis pin from the sensor start point 59 as shown in FIG. 16 along the travel path 78 of the clevis pin 25. The indicating finger 68 will visually show the starting point 59 of an unactivated brake. Once the brake is activated the push rod 3 moves outwardly in a direction 78 towards the second indicating finger 67. The distance between the indicating fingers 67 and 68 represent the safe brake stroke travel. Once the magnetic clevis pin 59 travels past the indicating finger 67, the brake stroke travelling limit has been reached or exceeded the maximum recommended limits.

Also as shown in FIG. 16, the tip of the magnetic clevis 25 tends to move in an arc represented by dash line E. The sensor 14 may be optimally adjusted (so the travel path of the arc E will be within the region of the face of the sensor) by loosening the nuts 72 and rotating the sensor 14 as well as the visual indicating brackets 66 relative the sensor attachment arm 44. In other words, the sensor 14 as well as the visual indicating bracket 66 may be pitched or tilted slightly relative the sensor attachment arm 44 so that the influence of the magnetic tip of the clevis 25 optimally falls within the range of the sensor 14. This represents a fourth axis of movement FIG. 9 illustrates that in some circumstances a clamp on magnetic indicator pin 79 may be utilized instead of the magnetic clevis pin shown in FIGS. 10 and 11 depending on the configuration of the truck or trailer or the, like. In the arrangement shown in FIG. 9, a standard clevis pin 22 is utilized and in addition a clamp on magnetic clevis pin 79 can be used. The magnetic clamp on indicator pin 79 consists of a top part clamp clevis 15 and a bottom part clamp clevis 17 which are attached unto a clevis push rod 3 by means of fasteners 13. The magnetic clamp on indicator pin 79 also includes a magnet 84, which would then be oriented as described above so that the tip of the magnet is next adjacent, the mark 59.

As the magnetic tip 31 of the clevis pin 25 moves from the starting mark 59 in the direction of travel 78, the magnetic clevis pin 25 generates a magnetic field which sequentially turns on the Hall sensors 52. More specifically by viewing FIG. 14 the magnetic flux of the magnet 31 will first influence Hall sensor 52a and then Hall sensor 52b and so on until the magnet 31 finally influences Hall sensor 52f. In one embodiment the magnet 31 can influence up to three Hall switches 52 at a time. Such Hall switches can be unipolar or bipolar. Although FIG. 14 illustrates the use of six Hall switches 52, any number of switches can be used within the spirit of the invention.

Each Hall switch 52 can have certain voltages associated therewith when influenced by the magnet 31. For example, the following Hall switches may have the following voltages associated therewith:

| Switches | Single Hall Voltage |
| --- | --- |
| 52a | 0.8 volts |
| 52b | 1.6 volts |
| 52c | 2.4 volts |
| 52d | 3.2 volts |
| 52e | 4.00 volts |
| 52f | 4.55 volts |

As the magnet 31 sequentially moves past each of the Hall sensor 52 a signal 81 is generated in wire 82 depending on the movement of the magnet 31. For example, once the magnet 31 moves from Hall switch 52a to Hall switch 52b a differential or summation voltage (i.e. Hall Trigger Reference Voltage) may be generated which for example may represent 0.6 volts thus representing that the clevis pin has moved a distance from the starting mark 59 next adjacent the Hall switch 52b. FIG. 26 is a table showing other examples of the Hall Trigger Sequence Reference Voltage and associated display 20 colours to be described. Therefore such signal would represent movement of the back plate 11 and its corresponding brake wear value. Any combination of Hall switches 52 and voltage values may be selected within the spirit of this invention.

As seen in FIG. 7 each wheel axle 90 includes two brake cylinder assemblies as shown in FIG. 8, namely, one on the left wheel sides L and one on the right wheel sides R. Generally speaking a single airbrake cylinder assembly as shown in FIG. 8 will be utilized on the left side L and a single air brake cylinder assembly utilized on the right side R of an axle.

FIG. 17a is a representative view of a display which can be located within the cabin of a truck or the like or mounted on the under side of a trailer or the like. The display 20 shows four axles 90, the first axle group showing left air cylinder 1L and right air cylinder 1R. The second axle is represented by left air cylinder 2L and right air cylinder 2R with the third axle 90 showing the left air brake cylinder assembly 3L and right air brake cylinder 3R. Finally display 20 also shows the fourth axle and the air brake cylinder 4L and right air brake cylinder 4R. A maximum of four axles can be shown in display 20.

Figure 18:
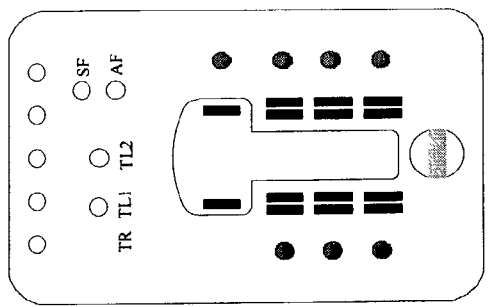

Each of the air brake cylinder assemblies as shown in FIG. 12 can be hard wired and connected to a multiplex transmitter module 80. In other words, the wires 82 from the sensors 14 are gathered to a multiplex transmitter module 80 as shown in FIG. 18.

Figure 17:
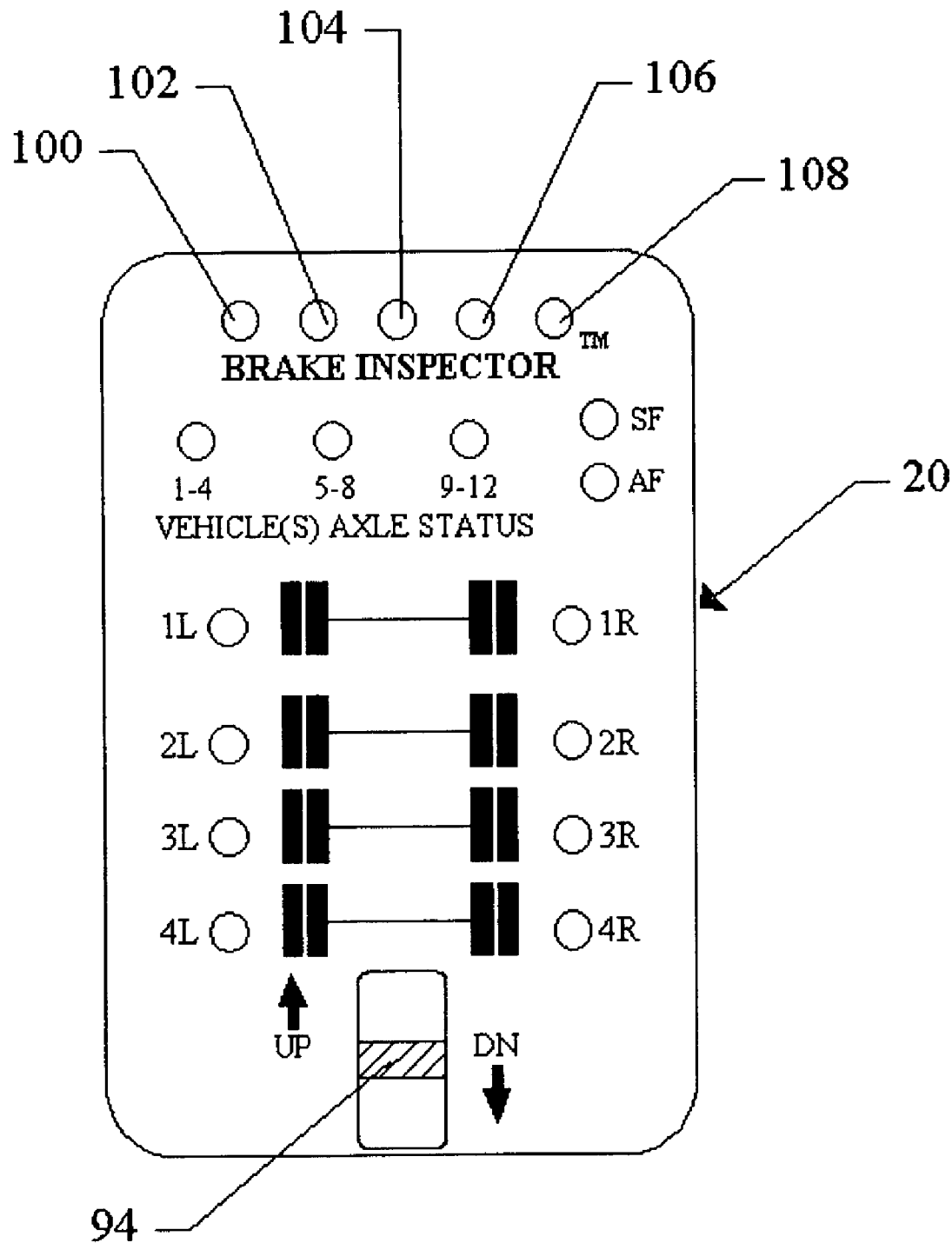
FIG. 17 is a representative drawing of the multi vehicle multiplexed display.
Figure 17:
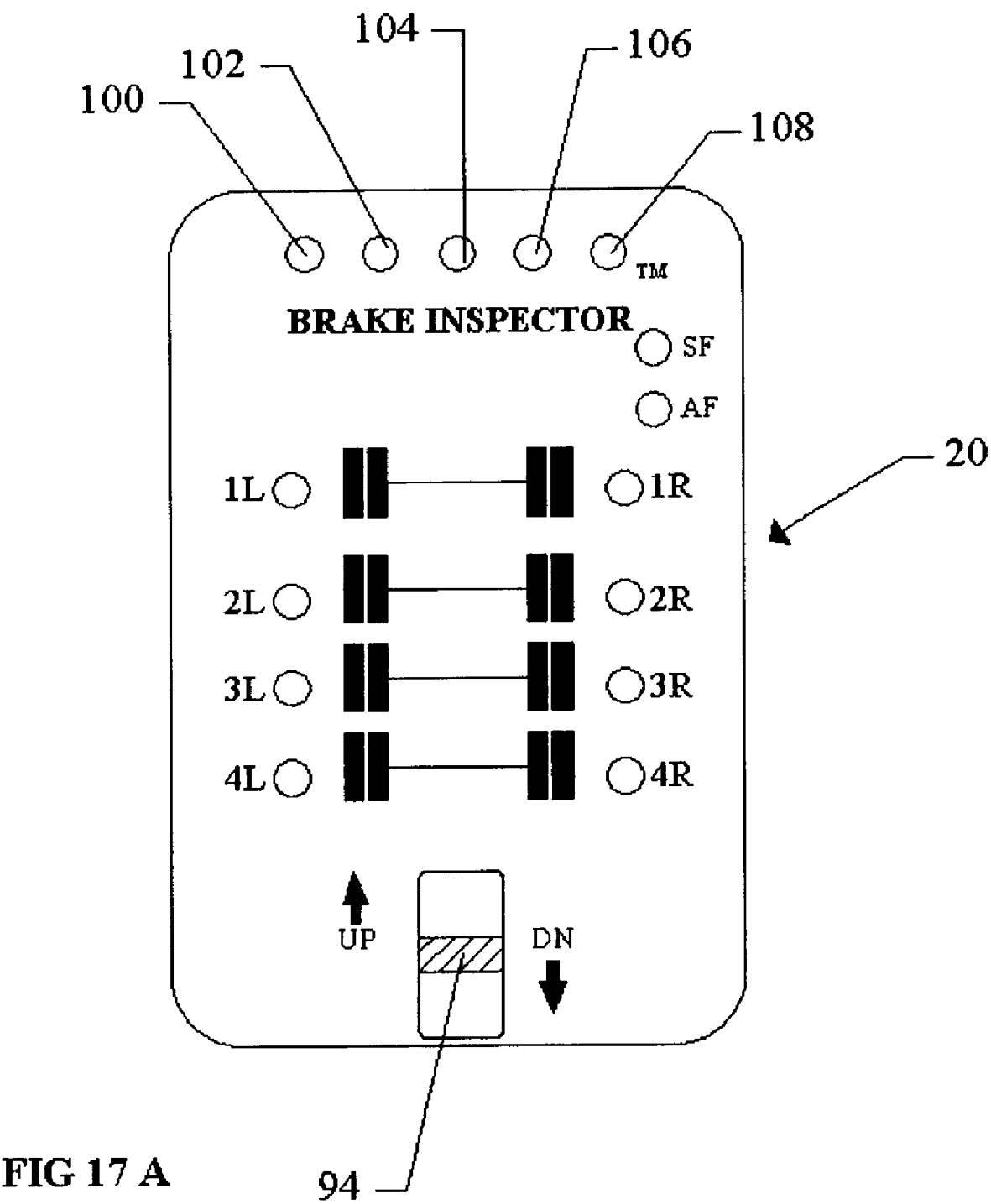
Figure 25:
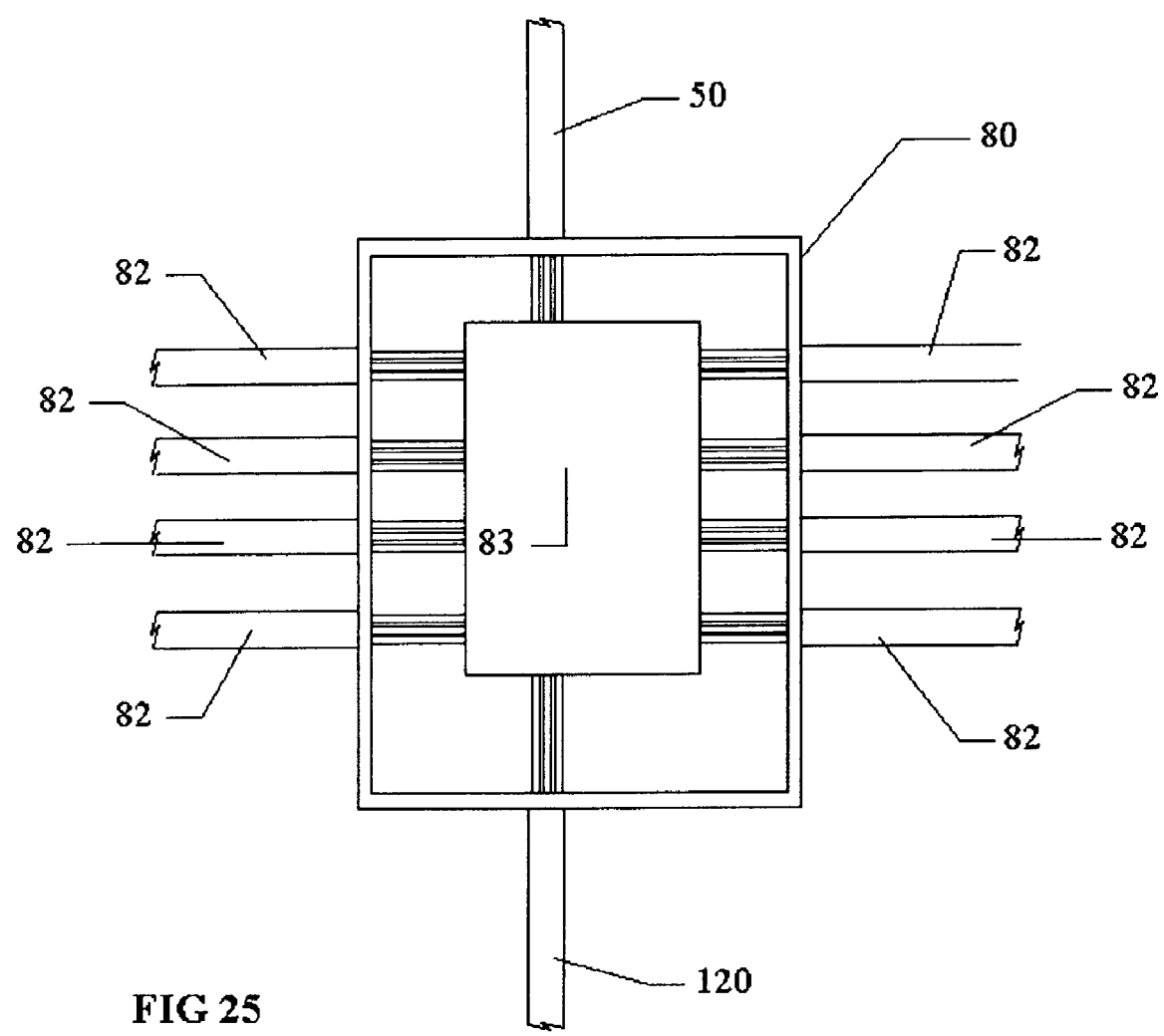
FIG. 25 is a representative view of the multiplexed module.

FIG. 25 illustrates the multiplexing of signals from the left and right sensors 14 associated with air brake cylinder assemblies as seen in FIG. 12 from each of the axles 90 representing the display in FIG. 17. The multiplex transmitter module 80 includes a computer chip 83 which is programmed to represent brake stroke travel as well as the various conditions to be described herein by generating signals 81 under the influence of the magnet 31 which influence the Hall switches 52 and the generation of the associated voltage values as for example shown in FIG. 25. The multiplex unit 80 then generates in the hard wire version illustrated in FIG. 7 a plurality of signals travelling through the wiring harness 50 connected to the display 20. The multiplex transmitter module 80 can also include a connector 120 to connect a number of multiplex modules 80 in series.

Alternatively a wireless multiplex system as shown in FIG. 6 may be utilized as described previously.

Alternatively a four axle hardwired (non multiplex) system may be utilized to provide connection to display 20.

FIG. 17 shows that the display 20 can monitor up to 12 axles by utilizing the toggle 94 so as to first light up the 1-4 vehicle axle status which generally illustrates the monitoring of the display 20 of a truck TR. By toggling once again the vehicle axle status of 5-8 lights up which represents a first trailer TL1. By toggling again vehicle axle status 9-12 lights up which represents a second trailer TL2. Therefore if one turns to FIG. 7 the display 20 would have a TR which would monitor the three truck axles while the display 20 would also monitor the trailer axles TL.

The display 20 also displays the brake wear gauge represented by LED displays 100, 102, 104, 106, and 108. In particular the first LED 100, 102 and 103 can be configured so as to successively display green lights which represent progressive travel of the magnetic clevis pin 25 relative the sensor 14 in the manner described herein and shown in FIG. 26. For example the first LED display 100 could represent $\frac{1}{8}^{th}$ of an inch of travel while the second LED display 102 would successfully light up after a further $\frac{1}{8}^{th}$ of an inch of travel and finally LED display 104 could light up after a total of $\frac{3}{8}$ of an inch of travel. LED display 106 could be configured so as to light up a yellow signal representing to the driver that the brake wear is successively deteriorating while the LED 108 could light up red to show that the maximum brake wear has been reached. The toggle 94 can be utilized to toggle through successively each of the air brake cylinder 1L, 1R, 2L, 2R, 3L, 3R, 4L and 4R.

Furthermore the LR or RR LED display will automatically light up once a yellow or red status of the brake wear 106, 108 has been reached.

Display 20 also includes an alignment fault signal AF and a sensor fault signal SF.

FIG. 18 shows that the truck display TR is green and the wheel end status LED's are also green which represents that the foot brake is on and all air brake cylinders are working properly.

Figure 19:
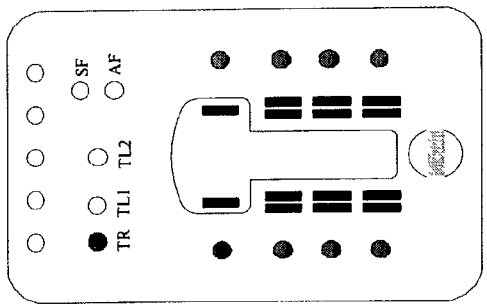
FIGS. 18-24 inclusive illustrate the various display feature of the multiplexed display.

FIG. 19 shows that the truck TR shines yellow and that the first left air cylinder 1L also shines yellow whereas the remaining left and right L and R air brake cylinders are shining green. This represents that the foot brake is on and that the first left air brake cylinder is close to the maximum brake wear allowed such as for example $1/8^{th}$ of an inch remaining.

Figure 20:
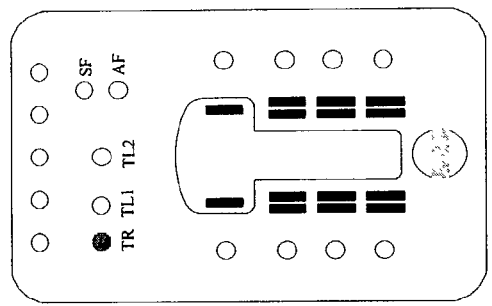

FIG. 20 shows that the TR is red and that 1L is red with the remaining left and right air brake cylinders are green. This display illustrates that the foot brake is on and that the first left air brake cylinder has brake wear at the maximum allowable position. Brake replacement is required.

Figure 21:
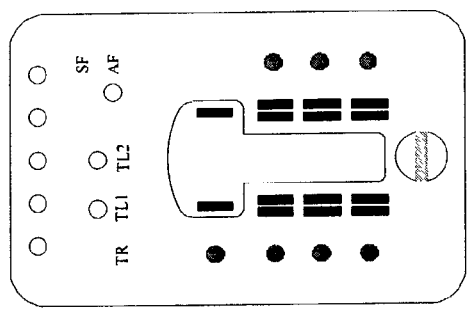

FIG. 21 shows that the truck TR has a flashing red light with the fourth left air brake cylinder also flashing red, with the remaining brake cylinders LR showing green. This display illustrates that the foot brake is on and that the fourth left air brake cylinder did not activate. The system described herein is capable of diagnosing non-activated air brake cylinders through the computer chip 83 since the required voltage changes have not taken place because the magnetic clevis pin has not travelled past the sensor 14.

Figure 22:
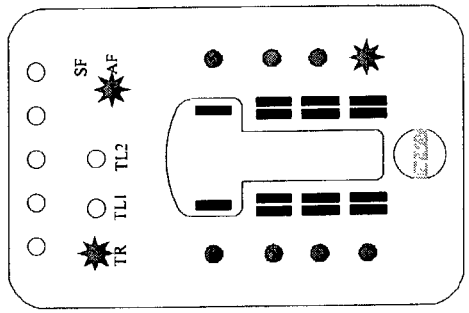

FIG. 22 illustrates that the truck TR has a yellow flashing signal and that the sensor fault SF is also flashing yellow along with a flashing yellow light at position 1R. All remaining air brake cylinders LR remain green. The display shown in FIG. 22 shows that the foot brake is on and that the first right sensor 14 is faulty. Since the proper voltage sequences of the magnetic tip 31 travelling past the Hall switches 52 were not experienced.

Figure 23:
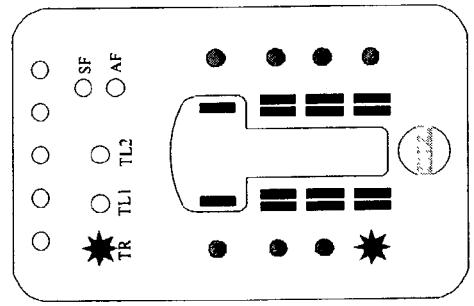

FIG. 23 next shows that the truck TR has a flashing green along with an alignment fault AF showing a flashing green. The fourth right LED is also showing a green flashing light. All other sensors or air brake cylinders LR show a normal green light. This represents that the foot brake is on and that the fourth right sensor is out of alignment with the magnetic tip 31 of the clevis pin 25. Again this is accomplished through the use of the computer chip 83 and the program logic therein.

Figure 24:
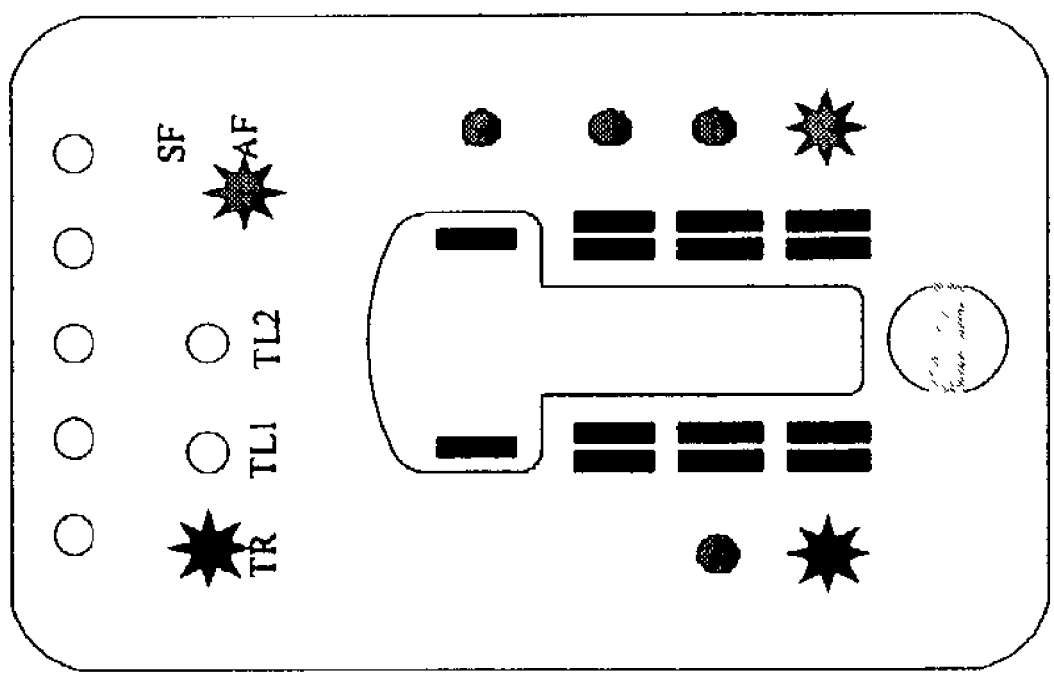

FIG. 24 next shows a truck TR showing a flashing red light with a sensor fault SF showing a yellow flashing light and an alignment fault AF showing a green flashing light. Furthermore FIG. 24 shows a red flashing light at position 4L with a green flashing light at position 4R. Position 1L shows a yellow flashing light, position 2L shows a yellow steady light, position 4L shows a red flashing light and position 4R shows a green flashing light with a normal green steady light at position 3L, 1R, 2R and 3R. The display shown in FIG. 24 illustrates that the foot brake is on, the first left sensor 4 is faulty, the second left air brake cylinder is $1/8^{th}$ of an inch away from maximum, that the fourth left sensor did not activate and the fourth right air brake cylinder is out of alignment. Generally speaking the computer chip 83 is programmed that if the multiplex unit 80 does not receive the right voltage this could represent that the sensor is faulty. Furthermore the computer chip 83 may be programmed so as to recognize when the sensor 14 is out of alignment with the magnetic tip 31 of the clevis pin.

Furthermore if debris hits the sensor 14 or if the magnet 31 is not present, the Hall switches 52 are selected to generate a specific voltage, which the system recognizes.

If the sensor 14 is out of alignment, the correct sequence of voltages are not experienced which the system recognizes.

The display 20 can be toggled for memory recall. For example if the toggle 94 is toggled up the memory is recalled to the last full reading. By manipulating the toggle 94 down one can toggle down to each of the wheels individually. Furthermore by toggling down to each of the individual wheels, if no light is present this means that there is no power.

Furthermore the data can be logged so as to store up to 16,000 exception reports which represent fault conditions. The display 20 can use a RF232 output so as to download brake activities into a computer.

Various embodiments of the invention have now been described in detail. Since. changes in and/or additions to the above-described best mode may be made without departing from the nature, spirit or scope of the invention, the invention is not to be limited to said details. For example although radar generating and receiving means have been described in relation to electromagnetic generating means other means such as light, radio frequency or microwave apparatus may be used.

We claim:

1. A sensor for attachment to a brake chamber having a moveable push rod comprising:
    (a) a sensor housing comprising:
        (i) a magnetic flux plate;
        (ii) a PCB board having a plurality of spaced apart Hall switches;
    (b) a bracket connecting said sensor housing to said brake chamber comprising:
        (i) an attachment portion;
        (ii) an attachment arm connected to said attachment portion at a substantially perpendicular angle relative said attachment portion in a first reference plane and at an acute angle at a second reference plane;
        (iii) said attachment portion and attachment arm each including a slot;
        (iv) said attachment portion slot adapted for connection to said brake chamber;
        (v) said attachment arm slot adapted to receive said sensor housing;
    (c) a magnet connected to said moveable push rod wherein said magnet comprises a magnetic clevis pin for displaceable movement relative to said sensor housing, whereby said POB board disposed between said magnetic flux plate and said magnetic clevis pin generates a signal in response to said magnetic clevis pin for measuring the brake condition of a vehicle.

2. A sensor as claimed in claim 1 wherein said bracket includes three degrees of adjustment.

3. A sensor as claimed in claim 2 wherein each said sensor generates a signal to a display by means of a wire.

4. A sensor as claimed in claim 3 wherein said vehicle includes a sensor for each wheel having a brake chamber and said signals for each said sensor are multiplexed in a module.

5. A sensor as claimed in claim 4 wherein said signal is delivered by said multiplex module to said display.

6. A sensor as claimed in claim 2 wherein each said sensor generates a wireless signal to a display.

7. A sensor as claimed in claim 6 further including a visual indicating bracket associated with said sensor, said visual indicating bracket attached to said attachment arm.

8. A sensor as claimed in claim 7 wherein said magnetic clevis pin moves along an arc spaced from and adjacent to said sensor housing, and between said visual indicating bracket.

9. A sensor as claimed in claim 8 wherein said magnetic clevis pin successively influences each said plurality of spaced Hall switches to generate a plurality of signals respectively.

10. A sensor as claimed in claim 9 wherein each said Hall switch has a generated voltage associated therewith when influenced by said magnetic clevis pin.

11. A sensor as claimed in claim 10 wherein said display includes a representation of each said brake chamber on said vehicle.

12. A sensor as claimed in claim 11 wherein said multiplex module includes a computer chip programmed to represent brake stroke travel, when said signals are received by said multiplex module and delivered to said display.

13. A sensor as claimed in claim 1 wherein said sensor is capable of being tilted relative said bracket to optimize the influence of said magnet relative to said plurality of sensors.

14. A sensor for attachment to a brake chamber having a moveable push rod comprising:
 (a) a sensor having a plurality of Hall switches;
 (b) a bracket for attachment to said brake chamber comprising:
  (i) an attachment portion;
  (ii) an attachment arm connected to said attachment portion at a substantially perpendicular angle relative said attachment portion in a first reference plane and at an acute angle at a second reference plane;
  (iii) said attachment portion and attachment arm each including a slot;
  (iv) said attachment portion slot adapted for connection to said brake chamber;
  (v) said attachment arm slot adapted to receive said sensor housing;
 (c) a magnet clevis pin attached to said push rod and spaced from said sensor housing for traversing said Hal switches and generating a signal in response to movement of said magnetic clevis pin relative to said switches to measure a brake condition of a vehicle.

* * * * *